United States Patent
Schumann

(10) Patent No.: US 9,462,360 B2
(45) Date of Patent: Oct. 4, 2016

(54) PORTABLE AUDIO DEVICE

(71) Applicant: Luke Harold Schumann, Zimmerman, MN (US)

(72) Inventor: Luke Harold Schumann, Zimmerman, MN (US)

(73) Assignee: Luke Harold Schumann, Zimmerman, MN (US)

( * ) Notice: Subject to any disclaimer, the term of this patent is extended or adjusted under 35 U.S.C. 154(b) by 127 days.

(21) Appl. No.: 14/588,074

(22) Filed: Dec. 31, 2014

(65) Prior Publication Data

US 2015/0189413 A1    Jul. 2, 2015

Related U.S. Application Data

(60) Provisional application No. 61/922,895, filed on Jan. 2, 2014.

(51) Int. Cl.
*H04R 1/02* (2006.01)
*H02J 7/00* (2006.01)

(52) U.S. Cl.
CPC .. *H04R 1/02* (2013.01); *H02J 7/00* (2013.01)

(58) Field of Classification Search
None
See application file for complete search history.

(56) References Cited

U.S. PATENT DOCUMENTS

| | | | | |
|---|---|---|---|---|
| 4,279,342 A * | 7/1981 | Van Pelt | ............... | A45C 15/00 206/542 |
| 4,571,740 A * | 2/1986 | Kirby | ............... | A45C 11/20 206/216 |
| 4,700,395 A * | 10/1987 | Long | ............... | A45C 11/20 381/334 |
| 4,817,191 A * | 3/1989 | Adams | ............... | A45C 15/00 455/344 |
| 4,939,912 A * | 7/1990 | Leonovich, Jr. | ........ | A45C 15/00 312/237 |
| 5,004,105 A * | 4/1991 | Freadman | ............ | A45C 7/0027 206/320 |
| 5,235,822 A * | 8/1993 | Leonovich, Jr. | ........ | A45C 15/00 206/542 |
| 5,447,041 A * | 9/1995 | Piechota | ................ | A45C 11/20 206/542 |
| 5,781,853 A * | 7/1998 | Johnson | ............... | H04B 1/08 381/386 |
| 5,979,175 A * | 11/1999 | Ellison | ............... | A45C 15/00 455/351 |
| 6,216,488 B1 * | 4/2001 | Rucker | ............... | A45B 11/00 62/331 |
| 6,305,185 B1 * | 10/2001 | Sloan | ............... | A45C 5/14 62/235.1 |
| 6,980,788 B2 * | 12/2005 | Peeples | ............... | F25D 23/12 381/118 |
| 7,143,601 B1 * | 12/2006 | Jimenez | ............... | F25D 23/12 135/16 |
| 7,188,491 B2 * | 3/2007 | Donald, II | ............... | B62B 3/00 348/E5.128 |
| 7,806,271 B1 * | 10/2010 | Kraska | ............... | A45C 11/20 206/216 |
| 2003/0139169 A1 * | 7/2003 | Arreazola, Jr. | ........ | H04B 1/086 455/344 |
| 2008/0031483 A1 * | 2/2008 | Hill | ............... | F25D 23/12 381/334 |
| 2009/0158770 A1 * | 6/2009 | Cohrs | ............... | F25D 23/12 62/457.9 |
| 2010/0263398 A1 * | 10/2010 | Webb | ............... | F25D 3/08 62/331 |
| 2013/0266169 A1 * | 10/2013 | Davis | ............... | H04R 27/00 381/334 |
| 2014/0013789 A1 * | 1/2014 | Conrad | ............... | F25D 3/08 62/331 |
| 2015/0010189 A1 * | 1/2015 | Besay | ............... | H04R 1/028 381/334 |
| 2015/0159938 A1 * | 6/2015 | Weckerly | ............... | F25D 23/12 381/334 |

* cited by examiner

*Primary Examiner* — Brenda Bernardi

(57) ABSTRACT

The present invention is intended to be used in a variety of situations where the user desires to have a high-quality portable audio device.

On the market today, there cannot be found a rugged, portable audio device aimed at average users and containing expected elements such as (1) high-quality audio components, (2) an internal power source, (3) an integrated foolproof charging and power management system and (4) the ability to protect the internal components while still retaining the intended purpose of the original container.

The present invention contains the elements above and utilizes them in a way that is different from all previous inventions. All other inventions appear to be expensive, hefty in size and weight, require separate purchase of power sources and charging systems and eliminate the intended purpose of the original container.

1 Claim, 8 Drawing Sheets

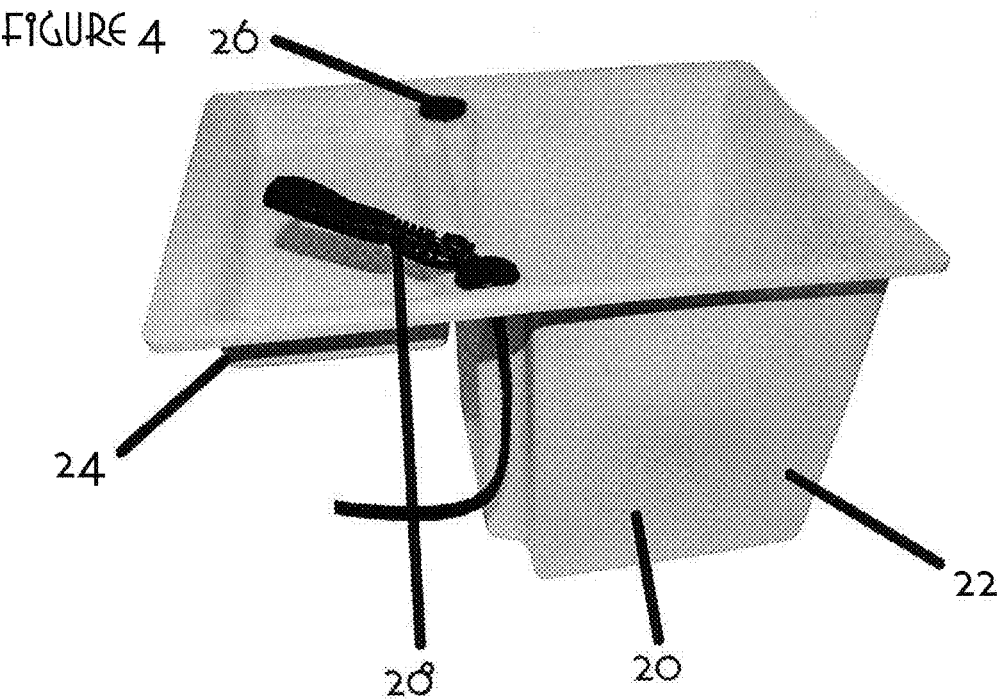

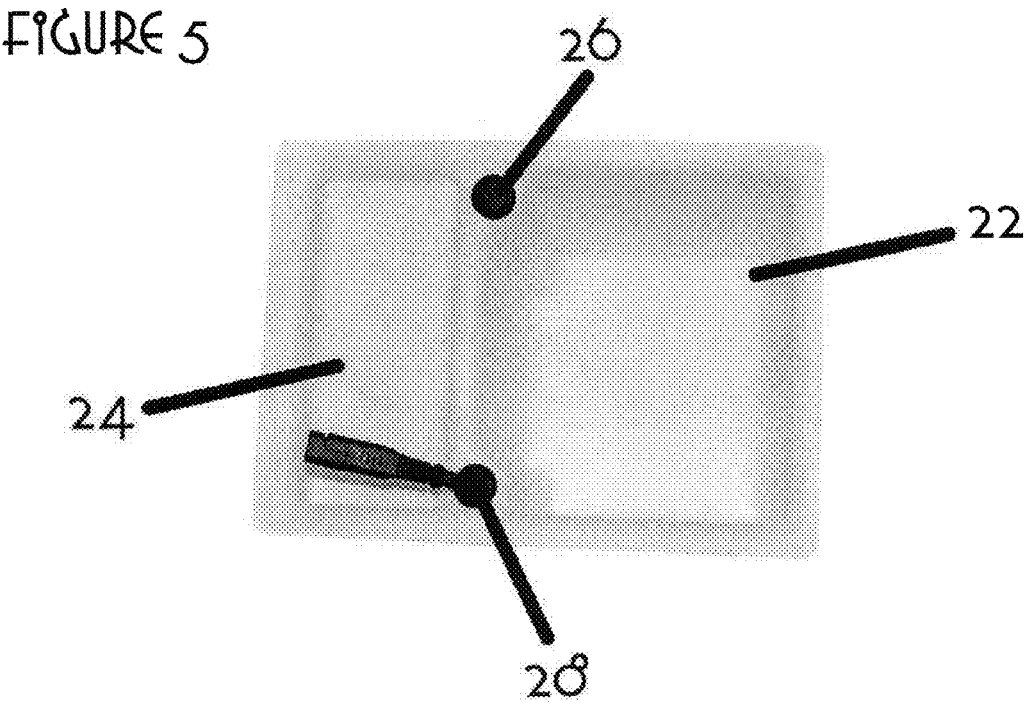

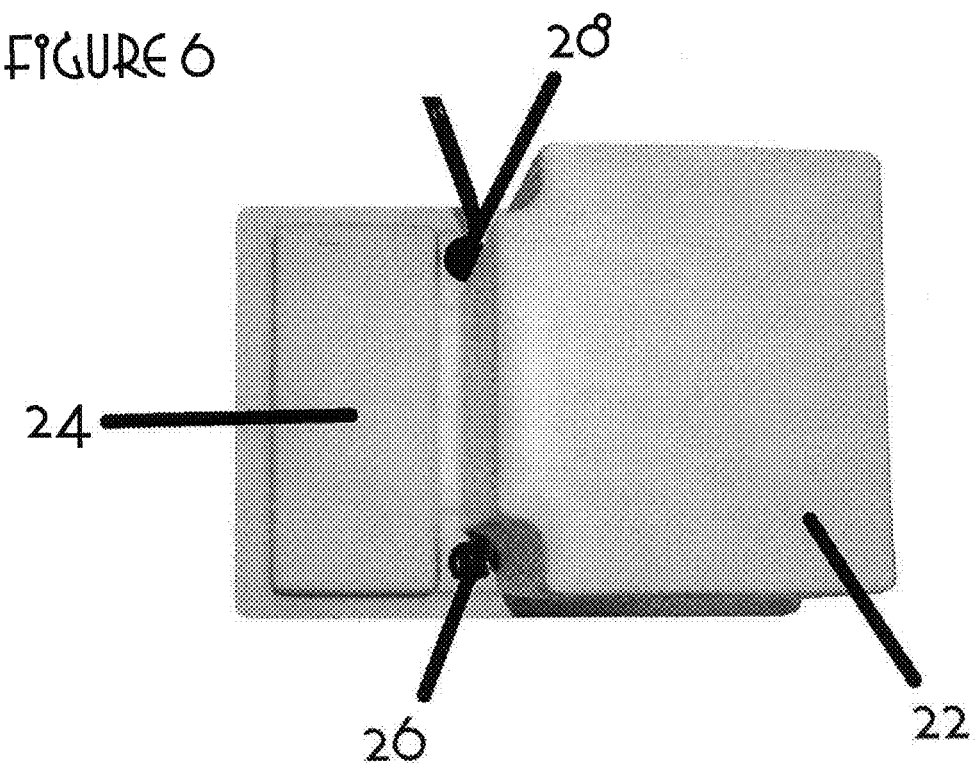

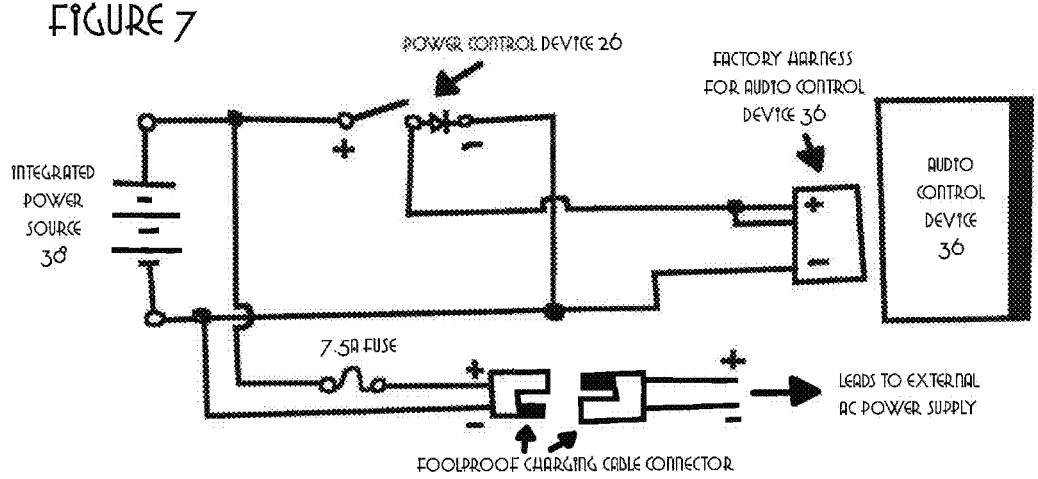

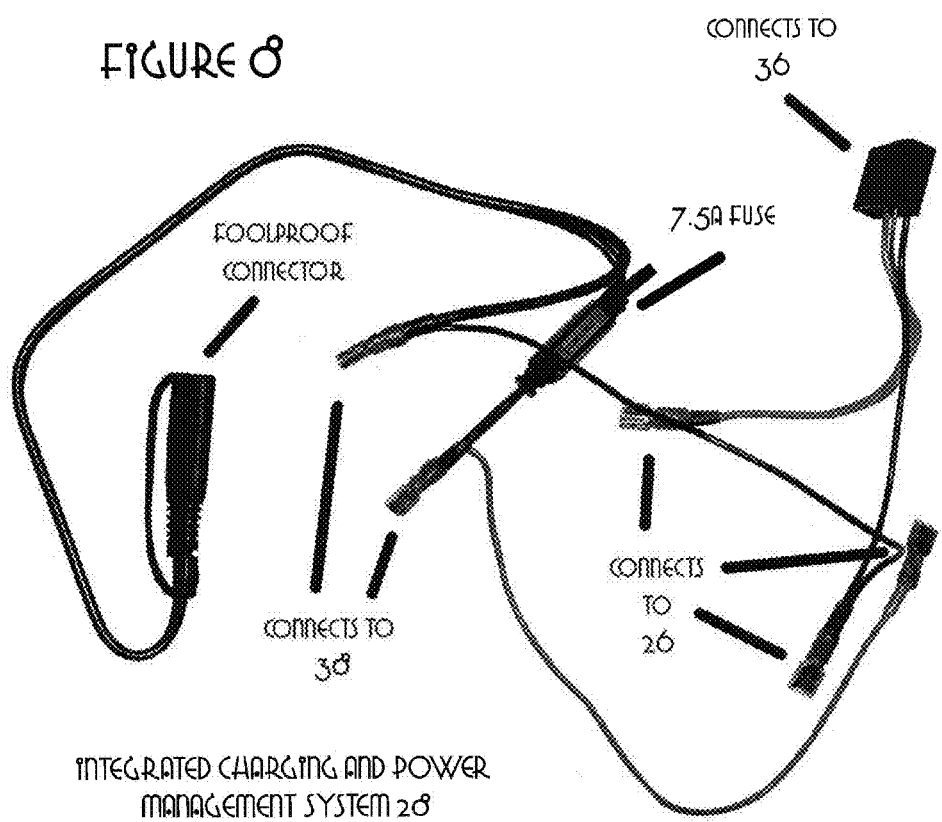

PORTABLE AUDIO DEVICE

BACKGROUND OF THE INVENTION

The present invention relates to portable recreational containers and, more particularly, to portable recreational containers combined with a self-powered audio system.

As the popularity of recreational containers combined with audio systems remains heavy, so do their designs as well as their price tag. The weight of the currently available audio-container designs undermines their portability and many require the separate purchase of heavy power sources. Additionally, their design is not generally found to be desirable by average users. Furthermore, such designs lack user friendly features such as an aesthetically pleasing method of protecting sensitive electronic devices, lacks a method to prevent users from connecting positive and negative battery cables from charging systems to batteries, lacks high quality audio reproduction from equally high quality audio components, lacks an integrated long-life battery and also lack an element to eliminate premature power source depletion.

As can be seen, there is a need for a recreational container combined with an audio system that is lightweight, has an element that structurally protects sensitive electronic devices, that incorporates a foolproof integrated charging and power management system, that includes a power source and that provides a master power switch to eliminate premature power source depletion.

BRIEF DESCRIPTION OF THE DRAWINGS

FIG. 4 is a perspective view of an exemplary embodiment of the removable housing of the present invention;

FIG. 5 is a top view of an exemplary embodiment of the removable housing of the present invention; and FIG. 6 is a bottom view of an exemplary embodiment of the removable housing of the present invention;

FIG. 7 is an electrical wiring diagram of the integrated charging and power management system;

FIG. 8 is a detailed top view of an exemplary integrated charging and power management system.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a container. The container may include a removable housing that forms a protected internal compartment. The removable housing may include foolproof connectors for an integrated charging and power management system along with a master power switch that eliminates premature power source depletion.

In certain embodiments, the internal compartment houses an electronic system or audio control device, which may be electrically connected to the integrated charging and power management system, to the power source and to the master power switch.

Figure 1:
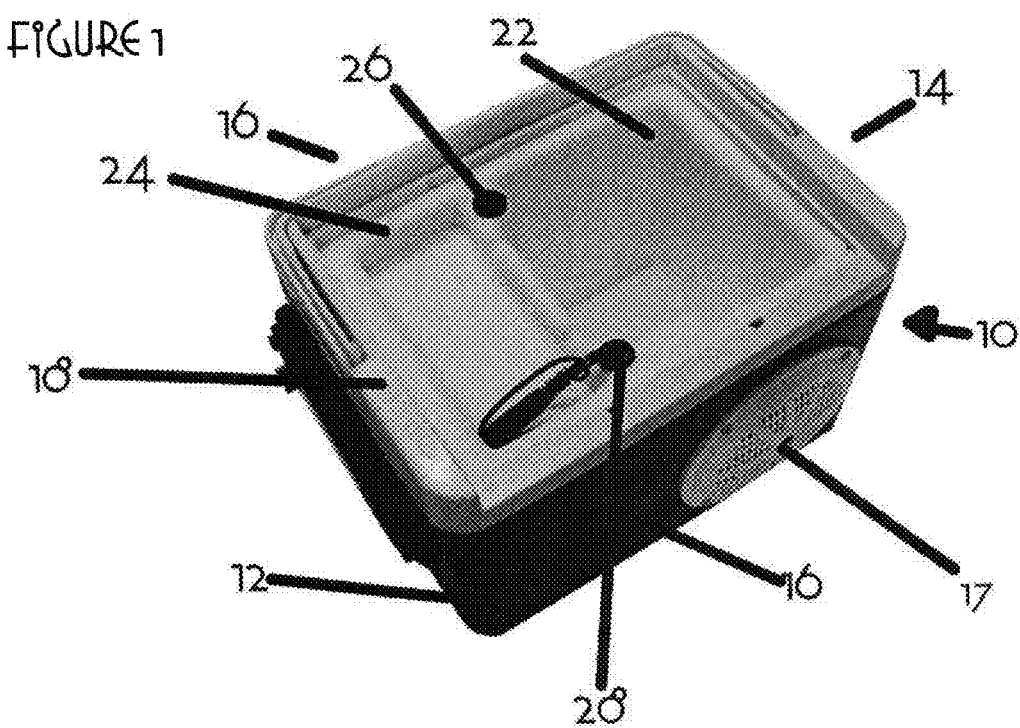
FIG. 1 is a perspective view of an exemplary embodiment of the present invention.
Figure 2:
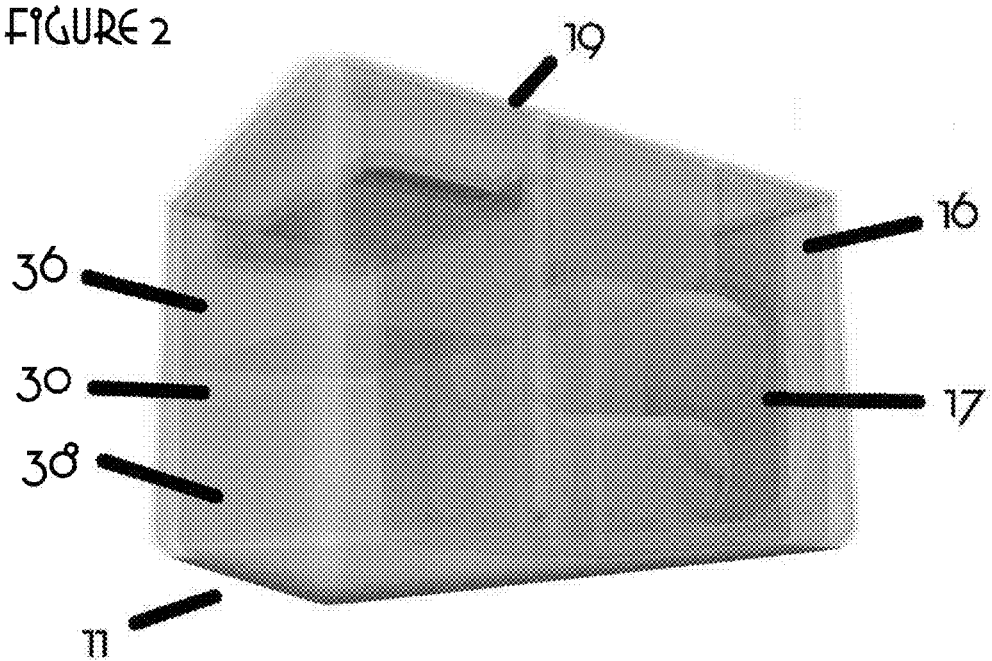
FIG. 2 is a detailed perspective view of an exemplary embodiment of the present invention.
Figure 3:
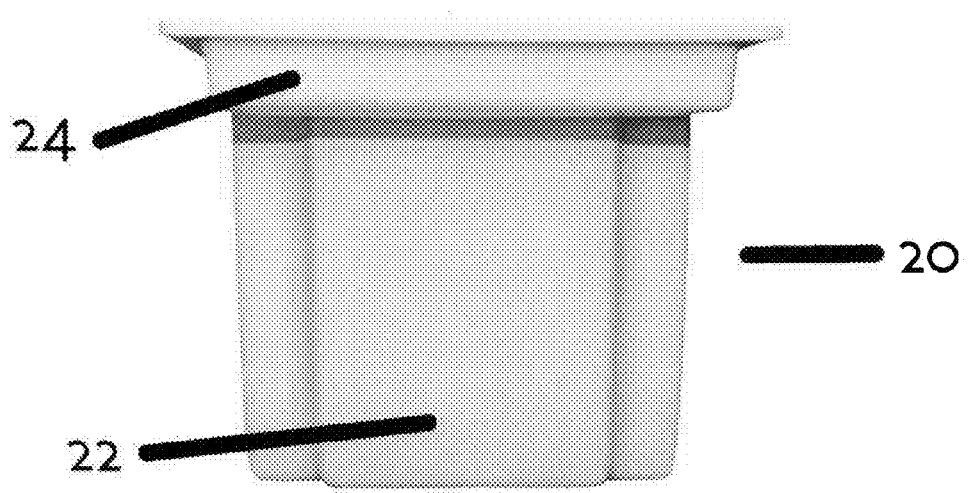
FIG. 3 is a side view of an exemplary embodiment of the removable housing of the present invention.

Referring now to FIGS. 1 through 8, the present invention may include a container 10 having an interior compartment 30, a removable housing 20 and a lid 19 that covers the top 18 of the container 10.

The container 10 may be defined by a front side 12, a rear side 14, a pair of sidewalls 16, the top 18 and a bottom 11. The pair of sidewalls 16 may include at least one output device 17. In certain embodiments, the at least one output device 17 may protrude through the pair of sidewalls 16. In certain embodiments, the output device may be speakers connected to an audio control device 36.

The removable housing 20 may include a first housing element 22, a second housing element 24, a foolproof connector for an integrated charging and power management system 28 and a master power switch 26. When the removable housing 20 may be positioned within the container 10, the first housing element 22 may extend from the top 18 of the container 10 to the bottom 11 thereof. When the removable housing 20 may be positioned within the container 10, the second housing element 24, the first housing element 22 and the container 10 form the interior compartment 30.

In certain embodiments, the interior compartment 30 may include a power source 38 and an audio control device 36. In certain embodiments, the audio control device 36 may protrude through the front side 12.

In certain embodiments, the integrated charging and power management system 28 may connect to the power source 38, the audio control device 36 and the master power switch 26. The integrated charging and power management system 28 may include a foolproof connector that ensures correct polarity when connecting to the supplied external AC power supply. The external AC power supply may indicate the amount of current charge and available power.

In certain embodiments, the audio control device 36 may include an audio system having a plurality of output signals, a plurality of input signals, at least one frequency receiver and at least one amplifier.

A method of using the present invention may include the following. The container 10 disclosed above may be provided. A user may open the lid 12 to activate the master power switch 26, so that any of the at least one device that may be electrically connected to the audio control device 36 receive power. The user may then store objects in the first housing element 22. To re-charge the present invention, in certain embodiments, the user may electrically connect the integrated charging and power management system 28 at the foolproof connector to an external AC power supply. The user may further remove the removable housing 20 to access the interior compartment 30.

It should be understood, of course, that the foregoing relates to exemplary embodiments of the invention and that modifications may be made without departing from the spirit and scope of the invention as set forth in the following claims.

What is claimed is:

1. A portable container and electronic system comprising:
a container; and
a removable housing; comprising:
 a first housing element,
 a second housing element, and an integrated charging and power management system configured to control and recharge an internal power source and an audio control device, wherein the removable housing is positioned within the container so that a side of the first housing element, the second housing element and the container form an internal compartment which protects sensitive internal electrical components.

\* \* \* \* \*